United States Patent
Iliadis et al.

(10) Patent No.: US 9,933,942 B2
(45) Date of Patent: Apr. 3, 2018

(54) METHOD FOR DIMENSIONING AND RECONFIGURING OF A STORAGE SYSTEM WITH REMOVABLE MEDIA

(71) Applicant: International Business Machines Corporation, Armonk, NY (US)

(72) Inventors: Ilias Iliadis, Zurich (CH); Yusik Kim, Zwolle (NL); Slavisa Sarafijanovic, Zurich (CH); Vinodh Venkatesan, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 14/941,980

(22) Filed: Nov. 16, 2015

(65) Prior Publication Data

US 2017/0139650 A1    May 18, 2017

(51) Int. Cl.
*G06F 12/00*   (2006.01)
*G06F 3/06*   (2006.01)

(52) U.S. Cl.
CPC .......... *G06F 3/0607* (2013.01); *G06F 3/0631* (2013.01); *G06F 3/0688* (2013.01); *G06F 3/0689* (2013.01)

(58) Field of Classification Search
CPC .... G06F 3/0607; G06F 3/0631; G06F 3/0688; G06F 3/0689

USPC ......................................................... 711/112
See application file for complete search history.

(56) References Cited

U.S. PATENT DOCUMENTS

| 8,234,005 B2 | 7/2012 | Starr et al. |
| 9,009,385 B1 * | 4/2015 | Juels ..................... G06F 3/0622 711/130 |
| 2015/0032251 A1 | 1/2015 | Hasegawa et al. |

* cited by examiner

*Primary Examiner* — Matthew Bradley
(74) *Attorney, Agent, or Firm* — Cantor Colburn LLP; Daniel Morris

(57) ABSTRACT

Embodiments include methods for operating a first storage system having a first number of data storage drives for enabling access to a first set of removable media. Aspects include providing a second storage system having a number K of data storage drives for enabling access to a second set of removable media and providing a set of parameters describing operational characteristics of the second storage system. Aspects also include determining an analytical model using the set of parameters, the analytical model describing the variation of average waiting time as a function of system load over a predefined range covering multiple system load regime domains and determining values of the set of parameters using the analytical model and data of the second storage system. Aspects further include using the analytical model and the values of the set of parameters for reconfiguring the first storage system.

18 Claims, 3 Drawing Sheets

METHOD FOR DIMENSIONING AND RECONFIGURING OF A STORAGE SYSTEM WITH REMOVABLE MEDIA

BACKGROUND

The present invention relates to the field of digital computer systems, and more specifically, to a method for operating a storage system with removable media.

Data storage drives such as tape drives are expensive compared to tape cartridges and also take more space. Therefore overprovisioning the number of tape drives is typically not feasible both for cost and space reasons. And, being able to assign a proper number of read-writer data storage drives is important on a storage system level.

SUMMARY

Various embodiments provide a method for operating a storage system with removable media, a computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for operating a first storage system having a first number of data storage drives for enabling access to a first set of removable media. The method comprises: providing a second storage system having a number K of data storage drives for enabling access to a second set of removable media; providing a set of parameters describing operational characteristics of the second storage system; determining an analytical model using the set of parameters, the analytical model describing the variation of average waiting time as a function of system load over a predefined range covering multiple system load regime domains; determining values of the set of parameters using the analytical model and data of the second storage system; using the analytical model and the values of the set of parameters for reconfiguring the first storage system.

In another aspect, the invention relates to a computer system for operating a first storage system having a first number of data storage drives for enabling access to a first set of removable media. The computer system is configured for: providing a second storage system having a number K of data storage drives for enabling access to a second set of removable media; providing a set of parameters describing operational characteristics of the second storage system; determining an analytical model using the set of parameters, the analytical model describing the variation of average waiting time as a function of system load over a predefined range covering multiple system load regime domains; determining values of the set of parameters using the analytical model and data of the second storage system; using the analytical model and the values of the set of parameters for reconfiguring the first storage system.

In another aspect, the invention relates to computer implemented method for operating a first storage system having a first number of data storage drives for enabling access to a first set of removable media. The method includes providing a second storage system having a number K of data storage drives for enabling access to a second set of removable media and configuring the second storage system to process data access requests for a predefined time period, thereby collecting data of the second storage system, the data indicating a variation of average waiting time of the data access requests versus associated system load during the time period. The method also includes providing a set of parameters describing operational characteristics of the second storage system that are related to the data access requests; the set of parameters comprising at least the number K of data storage drives and determining an analytical model using the set of parameters, the analytical model describing the variation of average waiting time as a function of system load over a predefined range covering multiple system load regime domains. The method also includes fitting the collected data with the analytical model for determining values of the set of parameters for a best fit and determining a current first average waiting time and a current first system load of the first storage system. In response to determining that the first average waiting time is higher than a predefined time threshold, the method includes estimating a second system load for a second number of data storage drives using the first system load; wherein the first system load is a function of the number of data storage drives.

In another aspect, the invention relates to a computer system for operating a first storage system having a first number of data storage drives for enabling access to a first set of removable media. The computer system is configured for providing a second storage system having a number K of data storage drives for enabling access to a second set of removable media and configuring the second storage system to process data access requests for a predefined time period, thereby collecting data of the second storage system, the data indicating a variation of average waiting time of the data access requests versus associated system load during the time period. The computer system is also configured for providing a set of parameters describing operational characteristics of the second storage system that are related to the data access requests; the set of parameters comprising at least the number K of data storage drives and determining an analytical model using the set of parameters, the analytical model describing the variation of average waiting time as a function of system load over a predefined range covering multiple system load regime domains. The computer system is further configured for fitting the collected data with the analytical model for determining values of the set of parameters for a best fit and determining a current first average waiting time and a current first system load of the first storage system. In response to determining that the first average waiting time is higher than a predefined time threshold, the computer system is further configured for estimating a second system load for a second number of data storage drives using the first system load; wherein the first system load is a function of the number of data storage drives.

BRIEF DESCRIPTION OF THE DRAWINGS

In the following embodiments of the invention are explained in greater detail, by way of example only, making reference to the drawings in which.

DETAILED DESCRIPTION

Figure 1:
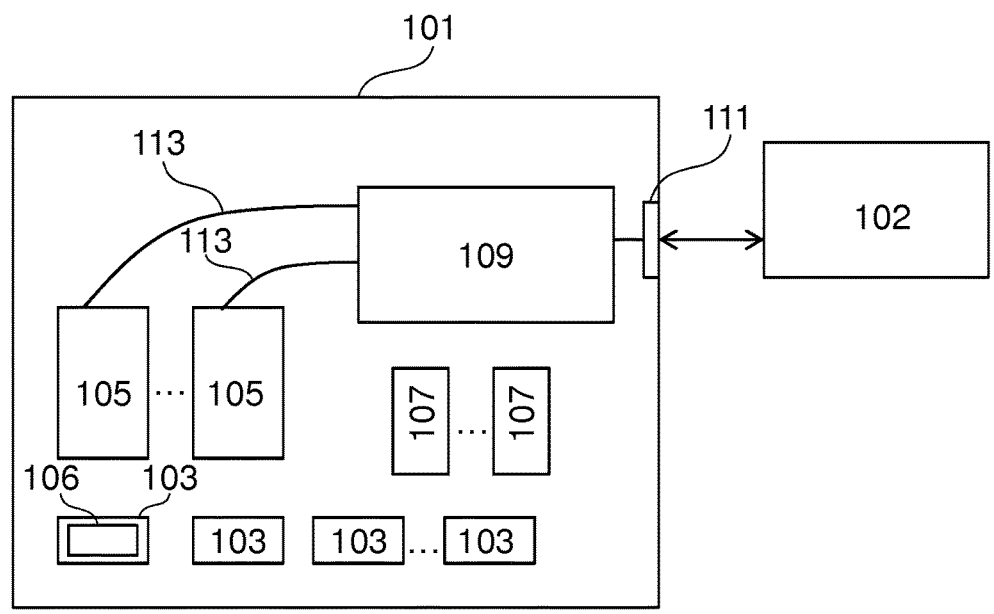
FIG. 1 illustrates a schematic configuration of a data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may avoid cases where read and write requests might experience unacceptably large delays or time-outs and fail such as the case of a tape library, where a small number of tape drives of a tape library are shared for reading and writing a large set of tape cartridges. The present method may improve read response time and enhance hardware lifetime of data storage systems by reducing the mechanical activity therein.

The present method may enable a proper operation of a storage system with removable storage media, by assigning an appropriate number of shared data storage drives to a set of removable storage media based on the observed or expected workload for that set of storage media. The data storage drives may be provisioned properly for an efficient and cost-effective use (cost in term of processing resources). Similar reasoning holds for other type of data storage drives such as optical disk archives and optical disk readers.

For example, there is a growing demand for using tape as a storage tier of a bigger tiered storage system aimed at serving many users and multiple tenants. The term "tenant" refers to a set of users that share the same hardware resources. This term has been used for storage systems that provide some level of storage resource isolation, e.g. for performance guaranties. Resources used by different tenants usually need to be isolated at each tier, owing to regulatory, security or performance guaranty requirements. On the tape tier this is typically done by assigning a set of tapes, often called a tape pool, to one or multiple users. Tape pools are not shared among tenants, and tape storage nodes and tape drives used to access those tape pools are also organized into groups not shared among the tenants. Data is typically accessed from an application or from a higher storage tier via storage nodes attached to tape drives, each node serving a number of drives that is typically fixed and that depends on the data rates that each drive and node can support. Consequently, in such a system, each tenant, or a set of tape pools, needs to be assigned a proper number of tape drives as provided by the present method.

An active tape archive with more frequent data access and complex workloads for which tape mounts and seeks become important, are recent and so far relatively small, and for this reason the importance of automated reconfiguration and optimized assignment was limited. However, this is changing rapidly, because the amount of cold data suitable for tape archives grows rapidly and tape is the most cost efficient storage media for such data. The present method may enable studying of the properties of a data storage system for all values of system load $\rho$ in the interval $[0;1]$, and may not focus only on the limiting regimes of $\rho \rightarrow 1-$, referred to as the heavy load regime, and $\rho \rightarrow 0+$, referred to as the light load regime.

Therefore, the problem of assigning a proper number of tape drives is becoming increasingly important. Public cloud storage offerings will need to do that in order to cost-efficiently satisfy service level agreements, and private cloud storage solutions will need that in order to meet performance expectations of different users or departments. The assignment will best be done by software-defined reconfiguring, allowing addressing on demand changes in service level agreements and user workloads.

As used herein, the term "load" or "workload" or "system load", $\rho$, may be defined using the number of data access requests (e.g., a request originating from a user). For example, $\rho = \lambda * S / K$, where $\lambda$ is the arrival rate of requests in the data storage system e.g. 0.02 requests/second, and S is the mean time to service a single request, and K is the number of data storage drives. For example, $S = Se + q/b$, where Se is the mean seek time, b is the bandwidth per data storage drive and q is the request size. Other definitions may for example be used for quantifying the system load. The term "user" may refer to an entity e.g., an individual, a computer, or an application executing on a computer that issues requests to read and/or write data.

A data storage drive as used herein is a device, module, circuit, etc. that can read and/or write data to/from a removable memory component or device. For example, and without limitation, data storage drives may comprise tape drives, flash memory drives, optical disk drives, optical tape drives, etc. A removable media as used herein may comprise a data storage cartridge that is a moveable/removable storage medium that may or may not be housed in a casing, container, package, etc. For example, and without limitation, removable media may comprise magnetic tape and optical disk.

The operational or operating characteristics (or parameters of the second storage system) of the second storage system may indicate features and/or structures of the second storage system that are used for operating the second storage system (e.g. for processing data access requests) such as the number of data storage drives and removable media of the second storage system, rate of the requests that are received at the second storage system etc. The operational characteristics are described by the set of parameters.

The multiple system load regime domains (or system load regimes) may each correspond to a sub-range of the predefined range. The multiple system load regime domains may for example be user defined. The number of second set of removable media may be equal to the number of the first set of removable media.

According to one embodiment, the method further comprises: obtaining the data of the second storage system by configuring the second storage system to process data access requests for a predefined time period, thereby collecting the data of the second storage system, the data indicating a variation of average waiting time of the data access requests versus associated system load during the time period.

According to one embodiment, determining the values of the set of parameters comprises: fitting the data with the analytical model for determining the values of the set of parameters for a best fit.

According to one embodiment, the determining of the analytical model comprises: splitting the predefined range into multiple subranges (each of the multiple subranges corresponds to a respective system load regime of the multiple system load regimes); determining an analytical model for each sub-range of the sub-ranges; and combining the determined analytical models of the sub-ranges into the analytical model of the predefined range. Each of the multiple subranges may correspond to a respective load regime. Taking into account different load regimes may be advantageous in that the determined analytical model may be accurate and thus the re-configuration of the first storage system may be reliable. This may for example avoid multiple configuration attempts and thus may save processing resources.

According to one embodiment, the multiple subranges comprise three sub-ranges, wherein the determining of the analytical model for each sub-range of the sub-ranges comprises: determining an M/G/k model for the smallest sub range; determining a polling model for the highest sub-range; determining an analytical model for the medium sub-range (having a moderate load regime) that interpolates between the M/G/k model and the polling model. This may have the advantage of seamlessly integrating the present method with existing systems and improving the performance of existing systems. Using one of the M/G/k and the polling model to cover the whole predefined range as it is the case with conventional methods may not provide accurate results. The present method may provide an accurate combination of the two models. This may enable a reliable re-configuration of the first storage system. For the smallest sub-range (or low load regime) the second storage system may be considered as an M/G/k queuing system, while in the highest sub-range (or high load regime) the second storage system may be considered as a polling system.

According to one embodiment, wherein determining an analytical model for the medium sub-range comprises: building a unique line that is tangent to the M/G/k model at the higher value of the first sub-range and tangent to the polling model at the lowest value of the third sub-range. Using the tangent line the limits (e.g. $\rho_1$ and $\rho_2$) of the light and high load regimes.

According to one embodiment, the second data storage system comprises at least the first number of data storage drives of the first storage system, the number K ranging from the first number to a number greater than the first number. This may provide a reliable result since the second storage system has a configuration similar to the first data storage system.

According to one embodiment, the configuring of the second storage system comprising: using simulation data that is obtained from a simulation of the second data storage system based on a model of the second data storage system. This may speed up the process of re-configuration of the first storage system compared to a method where the second storage system is a real system.

According to one embodiment, the second storage system having a configurable number K of data storage drives, wherein the analytical model is determined for different values of K, wherein the evaluation of the second average waiting time is performed using the analytical model that corresponds to the second number of data storage drives.

According to one embodiment, the determining of the current first average waiting time and/or the reconfiguring of the first storage system are performed during runtime of the first storage system. This may increase the performance of the first storage system without interruption of the processes running on the first storage systems.

According to one embodiment, reconfiguring the first system to include a number of data storage drives equal to the second number of data storage drives comprising switching ON spares of data storage drives of the first storage system. For example, the spares of data storage drives may initially be switched OFF. This embodiment may enable a seamless reconfiguration of the first storage system.

According to one embodiment, the set of parameters comprising: the number K of data storage drives and associated second set of removable media, requests rate at the second set of removable media, bandwidth of the K data storage drives.

According to one embodiment, a data storage drive of the data storage drives comprises at least one of hard disk drive, tape drive, flash memory drive, optical disk drive and optical tape drive.

FIG. 1 illustrates a schematic configuration of a data processing system 100 according to an example of the present disclosure. For exemplification purpose the data processing system 100 is described as comprising a tape storage system. The data processing system 100 includes a tape library 101 and a control apparatus 102.

Tape library 101 includes a plurality of storage cells 103. Each storage cell 103 is configured to store a tape cartridge, generally in a known manner. Tape library 101 further includes a plurality of tape drives 105 such as International Business Machines (IBM®), TS1100 or Jaguar 3592 tape drives or any other tape drive known in the art. Generally, a removable storage media or volume, e.g., a data storage cartridge 106, is loaded into each of the tape drives. Each tape drive 105 is configured to access a tape cartridge when the tape cartridge is received in the tape drive 105. A plurality of robotic tape movers 107 are provided in tape library 101 for moving tape cartridges between the plurality of storage cells 103 and the plurality of tape drives 105.

The tape library 101 also comprises a library controller 109, which interfaces to control apparatus 102 through a communication port 111, which is preferably of SCSI format, although other communication protocols are suitable. The library controller 109 comprises circuitry which controls the action of the movers 107 in response to commands from the control apparatus through the SCSI communication port 111. The library controller 109 also interfaces with the tape drives 105 through communication cables 113, which are also preferably SCSI format.

Figure 2:
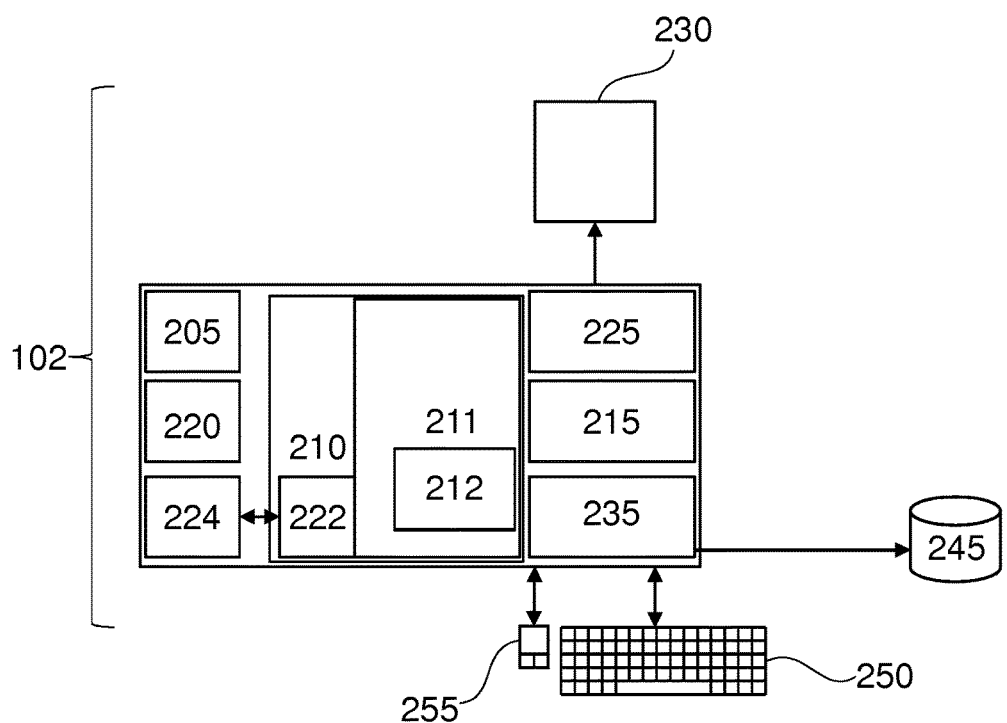
FIG. 2 illustrates a control apparatus in accordance with the present disclosure.

FIG. 2 represents a general computerized system 102 that describes further in details the control apparatus 102, suited for implementing method steps as involved in the disclosure. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 212, 222 (including firmware 222), hardware (processor) 205, or a combination thereof. In exemplary embodiments, the methods described herein are implemented in software, as an executable program, and is executed by a special or general-purpose digital computer, such as a personal computer, workstation, minicomputer, or mainframe computer.

In exemplary embodiments, in terms of hardware architecture, as shown in FIG. 2, the system 102 includes a processor 205, memory 210 coupled to a memory controller 215, and one or more input and/or output (I/O) devices (or peripherals) 245 that are communicatively coupled via a local input/output controller 235. The input/output controller 235 can be, but is not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 245 may generally include any generalized cryptographic card or smart card known in the art.

The processor 205 is a hardware device for executing software, particularly that stored in memory 210. The processor 205 can be any custom made or commercially available processor, a central processing unit (CPU), an auxiliary processor among several processors associated with the system 102, a semiconductor based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, and/or other types of storage media. Note that the memory 210 can have a distributed architecture, where various components are situated remote from one another, but can be accessed by the processor 205.

The software in memory 210 may include one or more separate programs, each of which comprises an ordered listing of executable instructions for implementing logical functions, notably functions involved in embodiments of this invention. In the example of FIG. 2, software in the memory 210 includes instructions 212 for implementing method for identifying dependencies between components.

The software in memory 210 shall also typically include a suitable operating system (OS) 211. The OS 211 essentially controls the execution of other computer programs, such as possibly software 212 for implementing methods as described herein.

The methods described herein may be in the form of a source program 212, executable program 212 (object code), script, or any other entity comprising a set of instructions 212 to be performed. When a source program, then the program needs to be translated via a compiler, assembler, interpreter, or the like, which may or may not be included within the memory 210, so as to operate properly in connection with the OS 211. Furthermore, the methods can be written as an object oriented programming language, which has classes of data and methods, or a procedure programming language, which has routines, subroutines, and/or functions.

In exemplary embodiments, a conventional keyboard 250 and mouse 255 can be coupled to the input/output controller 235. Other output devices such as the I/O devices 245 may include input devices, for example but not limited to a printer, a scanner, microphone, and the like. Finally, the I/O devices 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 240, 245 can be any generalized cryptographic card or smart card known in the art. The system 102 can further include a display controller 225 coupled to a display 230. In exemplary embodiments, the system 102 can further include a network interface for coupling to a network. The network can be an IP-based network. The network may be implemented in a wireless fashion, e.g., using wireless protocols and technologies, such as WiFi, WiMax, etc. The network can also be a packet-switched network such as a local area network, wide area network, metropolitan area network, Internet network, or other similar type of network environment. The network may be a fixed wireless network, a wireless local area network (LAN), a wireless wide area network (WAN) a personal area network (PAN), a virtual private network (VPN), intranet or other suitable network system and includes equipment for receiving and transmitting signals.

If the system 102 is a PC, workstation, intelligent device or the like, the software in the memory 210 may further include a basic input output system (BIOS) 222. The BIOS is a set of essential software routines that initialize and test hardware at startup, start the OS 211, and support the transfer of data among the hardware devices. The BIOS is stored in ROM so that the BIOS can be executed when the system 102 is activated.

When the system 102 is in operation, the processor 205 is configured to execute software 212 stored within the memory 210, to communicate data to and from the memory 210, and to generally control operations of the system 102 pursuant to the software. The methods described herein and the OS 211, in whole or in part, but typically the latter, are read by the processor 205, possibly buffered within the processor 205, and then executed.

When the systems and methods described herein are implemented in software 212, as is shown in FIG. 2, the methods can be stored on any computer readable medium, such as storage 220, for use by or in connection with any computer related system or method.

Figure 3:
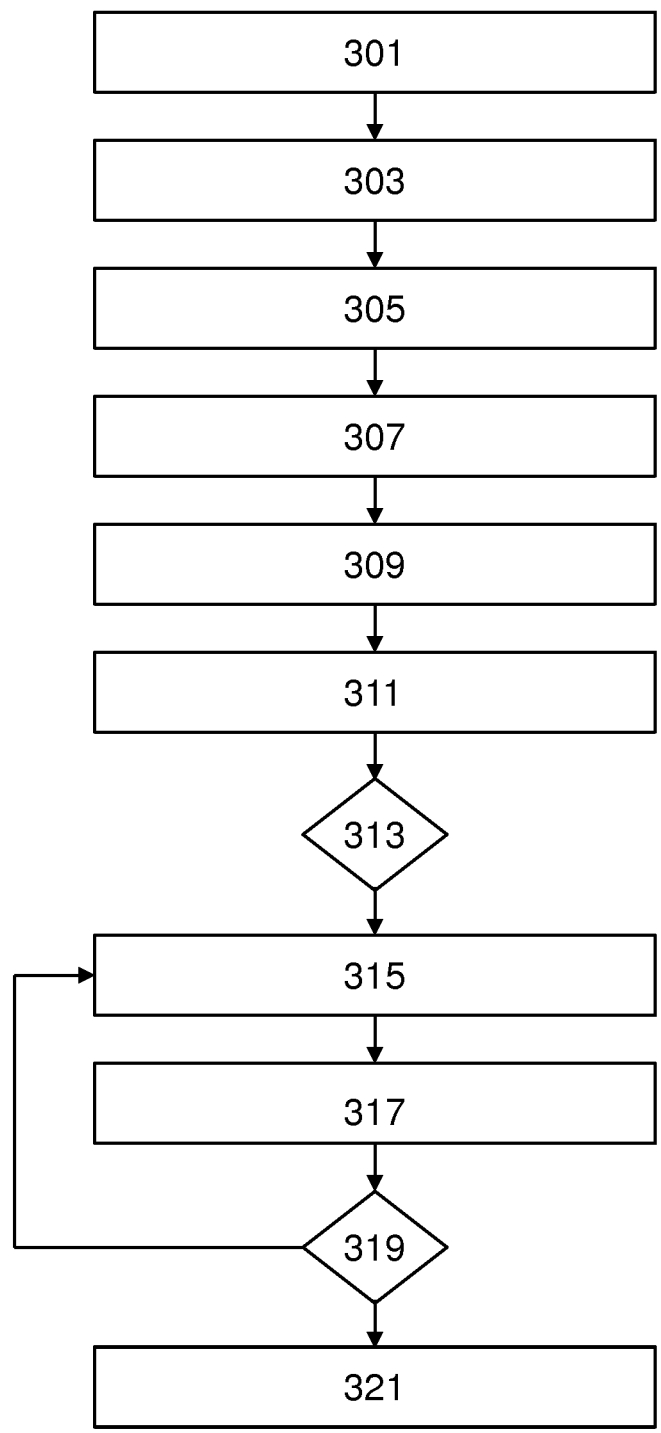
FIG. 3 is a flowchart of a method for operating a storage system with removable media.

FIG. 3 is a flowchart of a method for operating a first storage system having a first number M of data storage drives for enabling access to a first set of removable media. The first storage system may for example comprise tape library 101 as described above with reference to FIG. 1. As shown at block 301, a second storage system having a number K of data storage drives for enabling access to a second set of removable media may be provided.

The first and second storage systems may comprise automated storage systems such as automated tape libraries. The first and/or second storage systems may be configured to manage large amounts of data, either as part of a backup, archival and recovery system, or as part of normal IT operations. In one example, block 301 may comprise providing a description of the second storage system. The description of the second storage system may indicate the K data storage drives and the second set of removable media and their structures. The description may indicate the structure details of the second storage system.

The description may for example be received from a user of the first storage system. The description may be received in response to a request for the description e.g. the user may be prompted to provide the description. In another example the description may automatically be received as a periodic input by the user. The description may be used to emulate the second storage system using e.g. a software application in order to simulate the function of the second data storage system. In another example, the description may be used to physically build or provide the second storage system.

As shown at block 303, the second storage system may be configured to process data access requests during a predefined time period. For example, while processing the data access requests, data of the second storage system may be collected. The collected data indicates a variation of average waiting time (also referred to herein as mean wait time) of the data access requests versus associated system load during the time period. The time period may for example be user defined. In another example, the time period may be automatically defined (e.g. randomly) or selected from a predefined list of time periods. During that time period the data access request may be received and serviced or processed. For example, the control apparatus (or system) 102 may be used to control the second storage system. As shown with reference to FIG. 1, the control apparatus may be connected to the second storage system as described with the first storage system. In one example, the second storage system may comprise the first storage system having configurable number of data storage drives (e.g. can be switched off and on in order to change their number). In another example, the second storage system may be a separate system and the control apparatus 102 may be connected to both the first and second storage systems.

For example, the time period may be sub-divided into multiple time intervals and for each time interval an average waiting time of the data access requests that have been processing during that time interval may be determined and the system load of the second storage system for that time interval may also be determined. In another example, the average waiting time may be calculated for a predefined number of data access requests (e.g. first 1000 requests, then second 1000 requests etc.) and the system load may also be determined for that predefined number of data access requests.

The configuring of the second storage system may for example comprise simulating the response of the second storage system to the data access requests. For example, the data access requests may be generated and input or sent to the second storage system. The data access requests may for example comprise requests to read data from or to write data to at least part of the second set of removable media. The data access requests may be queued and prioritized according to predetermined attributes, for example, according to the information presently stored in main memory e.g. control apparatus 102, on a first-in first-out basis or other prioritization method.

The servicing or processing of the data access requests in the queue may be based at least in part on their assigned normalized priority. Every removable media may be assigned a queue that may comprise the data access requests to that removable media. For example, upon receiving a data access request (e.g. a read request) an entry is made in the request queue indicating which volume (or which removable media of the second set of removable media) the object to be read is stored on. If the pending read request is for an unmounted volume or unmounted removable media, servicing or processing the pending request may comprise sending a control message by e.g. library controller 109 to an available data storage drive or to a data storage drive to which the unmounted volume is assigned via a specific interface e.g. 113. And, the selected unmounted volume is mounted and the pending read request for that volume is processed.

During the predefined time period, different configurations for the generation/submission of data access requests may be used. For example, the data access requests may be received for each removable media of the second set of removable media at the same rate. This may have the advantage of enabling an equal treating of the removable media. In another example, the data access requests may be received at different rates for the different removable media e.g. the rate of data access requests for each removable media may be randomly chosen. This may have the advantage of providing a reliable result as it takes into account the real conditions where the removable media are not accessed in the same manner.

The term "waiting time" or "wait time" of a given request as used herein refers to the sum of the loading time of a removable media indicated by the given request (e.g. the removable media comprises data requested by the given request) and the queuing delay. The queuing delay is the wait time for previous requests in the queue (or requests having highest priority than the given request) to be processed. The loading time=unmount time+mount time. In case of "always unmount" case, the loading time of a cartridge on a data storage drive that has already been unmounted only involves a mount time. In case of an arriving request for a cartridge which is already mounted, its corresponding loading time is zero. In other words, a given request may have to wait for its corresponding removable media (e.g. a cartridge) to be available if the corresponding removable media is not already loaded and it potentially has to wait for other requests (e.g. in the queue of the corresponding removable media) that have to be processed before the given request. For example, in case a removable media is unmounted, it is retrieved from its location in the second storage system and inserted into the corresponding data storage drive.

As shown at block 305, a set of parameters describing characteristics of the second storage system necessary for processing the data access requests may be provided. For example, the set of parameters may comprise configuration parameters that have impact on the average waiting time e.g. different values of a parameter of the set of parameters may induce different average waiting times. For example, a stored list of parameters may be used to select the set of parameters. For that, a user may be prompted for selecting and/or inputting parameters which have impact on the waiting time (e.g. the set of parameters) out of the list of parameters. In another example, using information concerning previous usages of the second storage system or similar systems the set of parameters may be obtained.

As shown at block 307, an analytical model may be determined using the set of parameters. The analytical model describes the variation of the average waiting time as a function of the system load over a predefined range of values of the system load of the second storage system having K data storage drives, where K may vary from the first number M to a number higher than M. The predefined range may cover multiple load regime domains. The multiple load regime domains may comprise a low, medium and high load regime. The analytical model may be determined for different values of the number K of data storage drives of the second storage system.

The performance of the second storage system may depend on its load. For example, the system load or load may take values in the [0, 1] interval. For light loads, the performance of the second storage system may be obtained by considering the operation of an equivalent system. In particular, for the operation of a tape library considered, when the load is light, there may be at most one request pending in each queue. Thus, every time a request of a cartridge is served, there is no other request pending in the same cartridge, and therefore the data storage drive may have to unmount the cartridge and mount another one to serve another request. Therefore, the operation of the system is equivalent to that of a fictitious M/G/K model, with K denoting the number of data storage drives, and where the service time includes the setup (mount/unmount) times. In this case, the mean waiting time or mean waiting time may be given by a closed-form expression. On the other hand, for heavy loads, the performance of the system approaches that of a state-independent polling system, for which there are closed-form expressions.

A shape search unit (not shown) of the control apparatus 102 may determine the variation behavior of the average waiting time over a given sub-range (or load regime) of the predefined range and compare that behavior with a list of shape templates, wherein each of the shape templates is associated with a corresponding analytical model. Upon selecting the shape template that corresponds to the variation behavior, the corresponding analytical model may be used for modeling the given sub-range. In another example, a user may be prompted to provide or to input the analytical model and an indication of the analytical model may be received. For example, in case the predefined range covers a low, moderate (or medium) and high load regimes, the shape search unit may select the analytical model of the low and high load regimes as described above and an interpolation may be made between the two selected analytical models in order to determine the analytical model for the moderate or medium load regime.

As shown at block 309, values of the set of parameters may be determined using the analytical model and data of the second storage system. The data of the second storage system may be collected as described with the optional step 303. For example, the collected data may be fitted with the analytical model for determining the values of the set of parameters for a best fit. The difference between the values for the analytical model and the collected data is determined and error value is generated using a suitable error function such as Chi-square error function. For example, the error function may be calculated for each set of values of the set of parameters, and the set of values of the set of parameters that produces the smallest error value is chosen as the best-fit parameter values. Other approaches to parameter optimization may be used. The values of the set of parameters and the analytical model may be used for reconfiguring the first storage system. Blocks 311-321 describe an optional method for reconfiguring the first storage system using the values of the set of parameters and the analytical model.

In step 311, a current first average waiting time and a current first system load of the first system may be determined. The current first average waiting time may be determined at a predefined time window e.g. at the runtime of the first storage system or while the first storage system is running. For example, the average waiting time may be determined for data access requests that have been processed during the time window [t0; t1], where t1 may indicate the current time during the runtime of the first storage system. In another example, the current first average waiting time may be determined while the first storage system is offline or not running In this case, the current first average waiting time may be estimated for a time interval during which the first storage system has been lastly running.

It is checked (inquiry 313) if the first average waiting time is higher than a predefined time threshold. The time threshold may be defined or required by the user of the first storage system. For example, the user may not want to wait for a long time period to process a read or write request in the first storage system. In another example, the time threshold may automatically be determined e.g. by selecting the time threshold from a list of predefined time thresholds. The list of predefined time thresholds may for example be provided such that each time threshold is associated with a specific user or with a running time period. For example, an administrator of the first storage system may be assigned a time threshold that is smaller than a time threshold of a normal user of the first storage system.

In case the first average waiting time is higher than a predefined time threshold, block 315-319 may be performed. As shown at block 315, a second system load may be estimated (e.g. using equation Eq1 described below) for a second number of data storage drives using the first system load. The first system load may be expressed (or depends on) as function of the first number of data storage drives e.g. the system load of the first storage system may be linearly dependent of the number of data storage drives in the first storage system. In this case, by using a number of data storage drives in the linear dependence the system load may be estimated. In other words, the estimated second system load would reflect the system load of the first storage system if the first storage system would have the second number of data storage drives.

As shown at block 317, the analytical model and the values of the set of parameters may be used for evaluating a second average waiting time associated with the second system load. The analytical model (e.g. F) describes the variation of the average waiting time as function of the system loads e.g. F(load)=time, the second average waiting time may be obtained by using the second system load as argument of F. For example, Table 1 described below may be used for evaluating the second average waiting time.

It is checked (inquiry 319) if the second average waiting time is smaller than the time threshold. In case the second average waiting time is smaller or equal to the time threshold, the first data storage system may be reconfigured in block 321 to include a number of data storage drives equal to the second number of data storage drives. In case the second average waiting time is higher than the time threshold, blocks 315)-321) for estimating a further second system load and a further second average waiting time. For example, a further second system load may be estimated at block 315 for a third number of data storage drives using the first system load, and at block 317 the further second average waiting time may be determined and so on.

The proposed scheme exhibits the following advantages over previous schemes: The performance measure considered can be efficiently obtained as a function of the system parameters without having to perform involved mathematical manipulations. The performance measure considered can be efficiently obtained as a function of the system parameters without having to resort to lengthy and possibly erroneous simulations. The system can subsequently be appropriately dimensioned, configured, or reconfigured. The proposed scheme can be used in the context of a tape library, or a tape archive, or an object storage built on top of the tape archive, where different mount/unmounts policies are considered. There is an inherent flexibility for optimizing system performance in time-varying environments.

In the following, an example method further detailing block 307 is described considering a tape system e.g. 101. The principle for the case of the tape system whose size is known. The number of queues is equal to the number of cartridges N that are served by K tape drives or servers of the storage system of the present example. It is assumed that the arrival rates $\lambda i$ for i=1, . . . , N, to the N cartridges of read/write requests per cartridge are available. Consequently, the total arrival rate $\lambda$ is known ($\lambda$=sum of $\lambda i$ for i=1, . . . , N), and the individual loads $\rho i$, as well as the system load $\rho$, are also available.

The analytical model and thus the performance measure of the tape system may be obtained as follows:

In the light load regime ($0<\rho<\rho 1$, with $\rho 1$ determined based on the system parameters), the performance measure considered is obtained analytically by considering an equivalent fictitious M/G/K queueing model, where the arrival rate is equal to $\lambda$, and the service times for the request include the setup (mount/unmount) times. The final analytical expression is obtained by taking also into consideration the performance of K queueing subsystems where each contains N/K cartridges that are served by a single data storage drive. Thus, the performance measure considered is given by:

W1($\rho$)=f1 (N, K, arrival rate distribution of all N cartridges, server performance characteristics such as mount time (M), unmount time (U), seek time, bandwidth).

In the heavy load regime ($\rho 2<\rho<1$, with $\rho 2$ determined based on the system parameters), the performance measure considered is obtained analytically by considering an equivalent state-dependent polling system, for which closed-form expressions for the performance measure are used. Thus, the performance measure considered is given by W2($\rho$)=f2(N, K, arrival rate distribution of all N cartridges, server performance characteristics such as mount time (M), unmount time (U), seek time, bandwidth).

In moderate load regime ($\rho 1<\rho<\rho 2$), the corresponding performance measure W3($\rho$) is obtained by considering a curve that meets the two previously obtained curves W1($\rho$) and W2($\rho$) at points $\rho 1$ and $\rho 2$, respectively. Thus, the performance measure considered is given by:

W($\rho$)=W1($\rho$) for $0<\rho<\rho 1$
W($\rho$)=W3($\rho$) for $\rho 1<\rho<\rho 2$
W($\rho$)=W2($\rho$) for $\rho 2<\rho<1$ Thus the obtained analytical model W($\rho$) that is a combination of W1, W2 and W3 may represent accurately the variation of the average waiting time over a range of multiple load regimes.

Figure 4A:
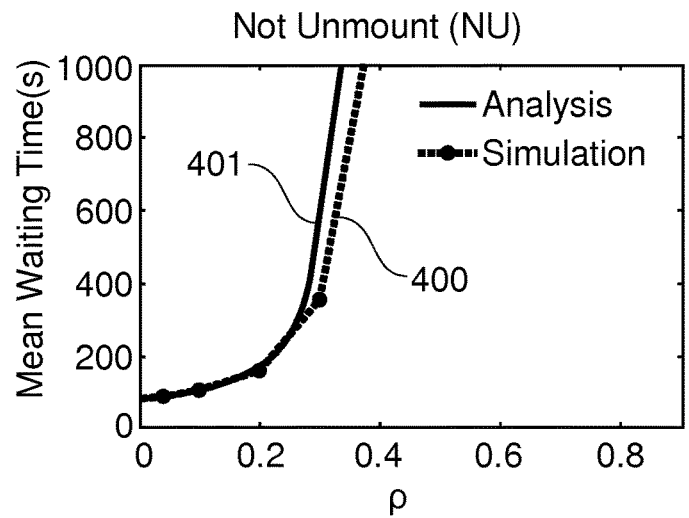
FIGS. 4A, 4B and 4C depict curves describing variation of average waiting time as function of system loads in simulation data and analytical models.
Figure 4B:
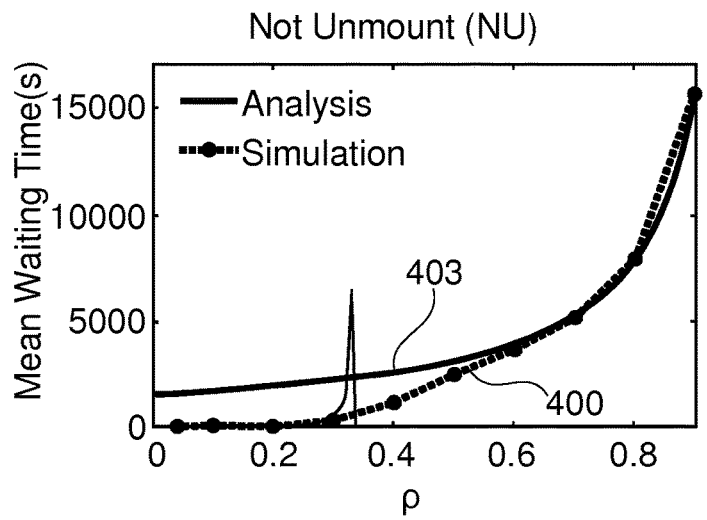
Figure 4C:
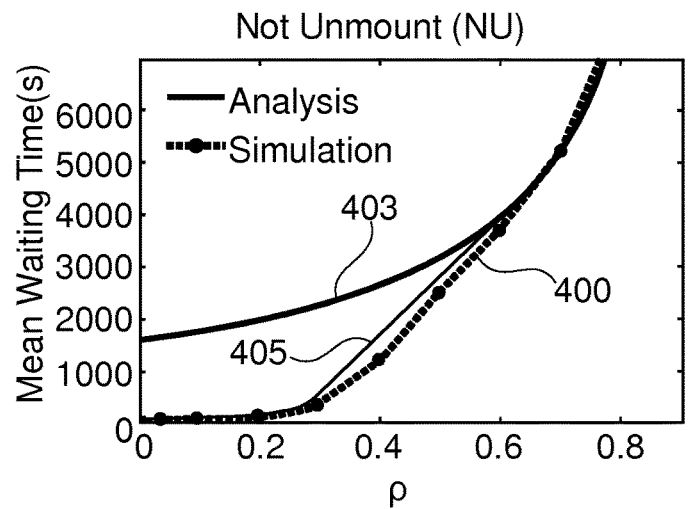

In the following a simplified system structure is used for exemplification purpose. For example, a data storage system (e.g. tape system 101) comprising a single data storage drive is considered. The data storage system may operate in a way that cartridges are not unmounted when they finish serving requests and there are no further requests to be served in the entire system (NU). FIGS. 4A-4C show the performance of the single data storage drive (K=1), where the storage system may be a symmetric tape system where all arrival rates, $\lambda i$ for i=1, ..., N, to the N cartridges are the same (i.e. $\lambda i=\lambda sym$ for i=1, ..., N and $\lambda=N*\lambda sym$), which is characterized by the following parameter values: the mean S to serve a single request is given by S=Se+q/b K: number of drives 1
N: number of queues 40
M: mean mount time 20 s
U: mean unmount time 60 s
Se: mean seek time 30 s
b: tape bandwidth 250 MB/s
q: request size 2.5 GB In this case, the mean time S to serve a single request is equal to 30+2500/250 seconds, that is, S=40 s.

In this example, $\rho_1$ may be defined as follows (e.g. for K=1).

$H=M$, for the "always unmount" case $H=(1-1/N)*(U+M)$ for the "not unmount" case.

$A=E[(S+U+M)^2]/(2*S)$ $a=1+(U+M)/S$ $g=2*N*S/[K*(U+M)]$ $X=A-a*(H+S)$ $Y=H+S-g*(A-a*H)$ $Z=-g*H$ $\rho_1[-Y+(Y^2-4*X*Z)^{1/2}]/(2*X)$ In this example, $\rho_2$ may be defined as follows (e.g. for K>1).

$G=E[S^2]/(2*S)$ $B=(N/K-1)*(U+M)/2$ $C=E[(U+M)^2]/[2*(U+M)]$ $X=K*(G-C-S)$ $Y=K*(B+C+S)+2*N*S$ $Z=-2*N*S$ $\rho_2[-Y+(Y^2-4*X*Z)^{1/2}]/(2*X)$ E[X] denotes the expected value of X (e.g. random variable X). E[$X^2$] denotes the second moment of X.

FIG. 4A shows the curve 401 corresponding to the W1($\rho$) model, and FIG. 4B shows the curve 403 corresponding to the W2($\rho$) model. The dotted line 400 corresponds to simulation results. Note the good match of the W1 and simulation data for light loads and the good match of the W2 and simulation for high loads. However, in FIG. 4A at load values higher than $\rho 1$ the analytical model W1($\rho$) does not represent well the variation of the average waiting time. In FIG. 4B at load values smaller than $\rho 2$ the analytical model W2($\rho$) does not represent well the variation of the average waiting time.

FIG. 4C shows the tangent curve 405 corresponding to the W3($\rho$) model, which defines the moderate traffic regime. In this particular case, the W3($\rho$) curve 405 is the unique tangent that meets the W1($\rho$) and W2($\rho$) curves at $\rho 1=0.3$ and $\rho 2=0.6$, respectively. The tangent approximates reasonably well the simulation line. Thus an analytical model that is a combination of W1, W2 and W3 may represent accurately the variation of the average waiting time over a range of multiple load regimes.

Considering a specific dimensioning example when the arrival rate of requests in the data storage system is equal to 0.02 requests/second. In this case the load of K data storage drives is given by:

$\rho=\lambda*S/K=0.02*40/K=0.8/K$ (Eq1)

For K=1, 2, 3, 4 the corresponding analytical and simulation mean waiting times are listed in the following table Table 1.

| | K | | | |
|---|---|---|---|---|
| | 1 | 2 | 3 | 4 |
| $\rho$ | 0.8 | 0.4 | 0.267 | 0.2 |
| Analysis (time in s) | 7920 | 863 | 139 | 83 |
| Simulation (time in s) | 7880 | 597 | 127 | 84 |

Suppose that the delay requirement is such that the mean waiting time should not exceed 100 s. From the analytical results presented in Table 1, it then follows that the tape library should use 4 data storage drives, which in turn results in a mean waiting time of 83 s. This outcome is confirmed by the simulation results shown in Table 1.

The methodology presented in the preceding can also be applied in the case where cartridges are always being unmounted when they finish serving requests and there are no further requests to be served in the system.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for operating a first storage system having a first number of data storage drives for enabling access to a first set of removable media, the method comprising:
providing a second storage system having a number K of data storage drives for enabling access to a second set of removable media, wherein K is greater than 1 and at least equal to the first number of data storage drives;
providing a set of parameters describing operational characteristics of the second storage system;
determining an analytical model using the set of parameters, the analytical model describing the variation of average waiting time as a function of system load over a predefined range covering multiple system load regime domains, wherein determining an analytical model comprises:
splitting the predefined range into multiple subranges;
determining an analytical model for each sub-range of the sub-ranges; and
combining the determined analytical models of the sub-ranges into the analytical model of the predefined range;
determining values of the set of parameters using the analytical model and data of the second storage system; and
using the analytical model and the values of the set of parameters for reconfiguring the first storage system, wherein reconfiguring the first storage system includes activating and/or deactivating data storage drives of the first storage system.

2. The method of claim 1, wherein the reconfiguring of the first storage system comprises:
determining a current first average waiting time and a current first system load of the first storage system;
in response to determining that the first average waiting time is higher than a predefined time threshold,
estimating a second system load for a second number of data storage drives using the first system load; wherein the first system load is a function of the number of data storage drives;
using the analytical model and the values of the set of parameters for evaluating a second average waiting time associated with the second system load;
in case the second average waiting time is smaller than the time threshold reconfiguring the first data storage system to include a number of data storage drives equal to the second number of data storage drives; otherwise repeating steps a)-c) for estimating a further second system load.

3. The method of claim 1, further comprising: obtaining the data of the second storage system by configuring the second storage system to process data access requests for a predefined time period, thereby collecting the data of the second storage system, the data indicating a variation of average waiting time of the data access requests versus associated system load during the time period.

4. The method of claim 1, wherein determining the values of the set of parameters comprises: fitting the data with the analytical model for determining the values of the set of parameters for a best fit.

5. The method of claim 1, wherein the multiple subranges comprise three sub-ranges, wherein the determining of the analytical model for each sub-range of the sub-ranges comprises:
determining an M/G/k model for the smallest sub range;
determining a polling model for the highest sub-range;
determining an analytical model for the medium sub-range that interpolates between the M/G/k model and the polling model.

6. The method of claim 1, wherein determining an analytical model for the medium sub-range comprises: building a unique line that is tangent to the M/G/k model at the higher value of the first sub-range and the polling model at the lowest value of the third sub-range.

7. The method of claim 1, wherein the second data storage system comprises at least the first number of data storage drives of the first storage system, the number K ranging from the first number to a number greater than the first number.

8. The method of claim 3, the configuring of the second storage system comprising: using simulation data that is obtained from a simulation of the second data storage system based on a model of the second data storage system.

9. The method of claim 1, the second storage system having a configurable number K of data storage drives, wherein the analytical model is determined for different values of K, wherein the evaluation of the second average waiting time is performed using the analytical model that corresponds to the second number of data storage drives.

10. The method of claim 2, wherein the determining of the current first average waiting time and the reconfiguring of the first storage system are performed during runtime of the first storage system.

11. The method of claim 1, reconfiguring the first storage system to include a number of data storage drives equal to the second number of data storage drives comprising switching ON spares of data storage drives of the first storage system.

12. The method of claim 1, wherein the set of parameters comprising: the number K of data storage drives and associated second set of removable media, requests rate at the second set of removable media, bandwidth of the K data storage drives.

13. The method of claim 1, wherein a data storage drive comprises at least one of tape drive, flash memory drive, optical disk drive, optical tape drive.

14. A computer program product comprising a computer-readable storage medium having computer-readable program code embodied therewith, the computer-readable program code configured to implement a method comprising:
providing a second storage system having a number K of data storage drives for enabling access to a second set of removable media, wherein K is greater than 1;
providing a set of parameters describing operational characteristics of the second storage system;
determining an analytical model using the set of parameters, the analytical model describing the variation of average waiting time as a function of system load over a predefined range covering multiple system load regime domains, wherein determining an analytical model comprises:
splitting the predefined range into multiple subranges;

determining an analytical model for each sub-range of the sub-ranges; and combining the determined analytical models of the sub-ranges into the analytical model of the predefined range;

determining values of the set of parameters using the analytical model and data of the second storage system;

using the analytical model and the values of the set of parameters for reconfiguring the first storage system, wherein reconfiguring the first storage system includes activating and/or deactivating data storage drives of the first storage system.

15. The computer program product of claim 14, wherein the reconfiguring of the first storage system comprises:

determining a current first average waiting time and a current first system load of the first storage system;

in response to determining that the first average waiting time is higher than a predefined time threshold, estimating a second system load for a second number of data storage drives using the first system load; wherein the first system load is a function of the number of data storage drives;

using the analytical model and the values of the set of parameters for evaluating a second average waiting time associated with the second system load;

in case the second average waiting time is smaller than the time threshold reconfiguring the first data storage system to include a number of data storage drives equal to the second number of data storage drives; otherwise repeating steps a)-c) for estimating a further second system load.

16. The computer program product of claim 14, further comprising: obtaining the data of the second storage system by configuring the second storage system to process data access requests for a predefined time period, thereby collecting the data of the second storage system, the data indicating a variation of average waiting time of the data access requests versus associated system load during the time period.

17. The computer program product of claim 14, wherein determining the values of the set of parameters comprises: fitting the data with the analytical model for determining the values of the set of parameters for a best fit.

18. A computer system for operating a first storage system having a first number of data storage drives for enabling access to a first set of removable media, the computer system being configured for:

providing a second storage system having a number K of data storage drives for enabling access to a second set of removable media, wherein K is greater than 1;

providing a set of parameters describing operational characteristics of the second storage system;

determining an analytical model using the set of parameters, the analytical model describing the variation of average waiting time as a function of system load over a predefined range covering multiple system load regime domains, wherein determining an analytical model comprises:

splitting the predefined range into multiple subranges;

determining an analytical model for each sub-range of the sub-ranges; and combining the determined analytical models of the sub-ranges into the analytical model of the predefined range;

determining values of the set of parameters using the analytical model and data of the second storage system; and using the analytical model and the values of the set of parameters for reconfiguring the first storage system, wherein reconfiguring the first storage system includes activating and/or deactivating data storage drives of the first storage system.

* * * * *